US012028413B1

(12) United States Patent
Johnston, Jr.

(10) Patent No.: US 12,028,413 B1
(45) Date of Patent: Jul. 2, 2024

(54) SYSTEM FOR COALESCING NETWORK REQUEST STREAMS

(71) Applicant: PUBWISE, LLLP, Atlanta, GA (US)

(72) Inventor: Stephen F. Johnston, Jr., Marietta, GA (US)

(73) Assignee: PUBWISE, LLLP, Atlanta, GA (US)

( * ) Notice: Subject to any disclaimer, the term of this patent is extended or adjusted under 35 U.S.C. 154(b) by 0 days.

(21) Appl. No.: 17/722,199

(22) Filed: Apr. 15, 2022

Related U.S. Application Data

(60) Provisional application No. 63/175,271, filed on Apr. 15, 2021.

(51) Int. Cl.
*H04L 67/1036* (2022.01)
*H04L 67/1014* (2022.01)
*H04L 67/1023* (2022.01)

(52) U.S. Cl.
CPC ...... *H04L 67/1036* (2013.01); *H04L 67/1014* (2013.01); *H04L 67/1023* (2013.01)

(58) Field of Classification Search
CPC .......... G06Q 30/0275; G06Q 30/0276; G06Q 30/0271; G06Q 30/0244; H04L 67/1014; H04L 67/1036; H04L 67/1023
See application file for complete search history.

(56) References Cited

U.S. PATENT DOCUMENTS

| | | | | |
|---|---|---|---|---|
| 9,674,134 | B2* | 6/2017 | Djin | H04L 51/52 |
| 11,095,506 | B1* | 8/2021 | Erblat | H04L 41/0813 |
| 11,522,810 | B2* | 12/2022 | Denninnart | H04L 47/827 |
| 2003/0225859 | A1* | 12/2003 | Radia | H04L 67/1001 |
| | | | | 709/219 |
| 2014/0063237 | A1* | 3/2014 | Stone | H04N 7/181 |
| | | | | 382/190 |
| 2014/0324603 | A1* | 10/2014 | Savkar | H04N 21/254 |
| | | | | 705/14.71 |
| 2017/0213255 | A1* | 7/2017 | Mysore | G06N 20/00 |
| 2017/0230705 | A1* | 8/2017 | Pardue | H04N 21/42222 |
| 2017/0302753 | A1* | 10/2017 | Larumbe | G06F 12/0833 |
| 2018/0082325 | A1* | 3/2018 | Kitts | G06Q 30/0277 |
| 2019/0138531 | A1* | 5/2019 | Lerman | G06F 16/9538 |
| 2020/0234342 | A1* | 7/2020 | Santiago | G06F 16/9566 |
| 2020/0245032 | A1* | 7/2020 | Murtaza | H04N 21/2335 |
| 2021/0067820 | A1* | 3/2021 | Shivapurkar | H04N 21/812 |
| 2021/0144168 | A1* | 5/2021 | Vester | G06F 9/451 |
| 2021/0185407 | A1* | 6/2021 | Marshall | G06Q 30/0275 |
| 2021/0256060 | A1* | 8/2021 | Janakiraman | G06F 16/7867 |
| 2021/0349721 | A1* | 11/2021 | Eyole | G06F 9/3836 |
| 2022/0314162 | A1* | 10/2022 | Jadhav | C10L 3/106 |

* cited by examiner

*Primary Examiner* — Dhairya A Patel
(74) *Attorney, Agent, or Firm* — Eleanor Musick; Torrey Pines Law Group, PC

(57) ABSTRACT

A system and method for coalescing network request streams assigns groups of requests to independent coalescing machines, each of which separately processes its assigned group according to processing rules. The use of independent coalescers allows the system to be scaled nearly infinitely with a shared nothing architecture and operates fully at machine in-process speeds.

18 Claims, 5 Drawing Sheets

SYSTEM FOR COALESCING NETWORK REQUEST STREAMS

RELATED APPLICATIONS

This application claims the benefit of the priority of U.S. Provisional Application No. 63/175,271, filed Apr. 15, 2021, which is incorporated herein by reference in its entirety.

FIELD OF THE INVENTION

The present application relates to a system and method for accelerating the handling of duplicate internet request streams.

BACKGROUND OF THE INVENTION

In recent years, the programmatic advertising industry has grown at such a rapid pace that network resources required to handle the real-time bid request/response traffic have become overwhelmed by the traffic, causing network delays, poor computing and network performance, lack of access to suitable ads, inefficient placement of ads, poor use of advertising budgets, poor scalability, and generally poor overall performance. The network resources simply have difficulty handling the traffic that is coming from the RTB (real-time bidding) ad exchanges, and the DSP (demand-side platform) servers are unable to keep up with the increased traffic flow without adding expensive additional capacity, further diminishing the effective performance of the programmatic advertising environment at affordable capacity levels.

RTB ad exchanges already offer trillions of bid requests per month. For example, Boston-based DataXu, founder of the Open RTB consortium, previously had seen 40% annual increases in queries, but experienced a 100% increase in 2016, which it attributed to header bidding. MediaMath saw a 20% rise in queries in 2017, with averages fluctuating between 5 million and 6 million queries per second. As a result, the DSP servers are required to evaluate enormous volumes of traffic in search of relevant ad inventory. While the RTB ad exchanges are mostly managing their demand sources without traffic flow tools, the DSPs are burdened with computing cost and scale problems that they cannot solve on their own.

While the webpage is loading, the SSP reaches out to an exchange to sell space on the loading page based on both the page subject matter/content and the associated personal information for the user who is loading the page, based on the user's prior browsing history. The exchange can seek to auction the ad space to DSPs based on what is known about the user and the site itself. This may involve contacting other exchanges, which in turn may contact even more exchanges, significantly multiplying the number of potentially-interested bidders for the same ad space. Many of these exchanges may then contact the same DSP to place a bid on the available ad space. Extreme duplication of the ad request can result, with the DSP receiving large numbers of duplicate bids by the same exchanges for the same ad space. To illustrate, with only 10 interconnected partners passing the request once, the DSP may have to contend with 111 requests, of which only 1 can be won at any time. This problem is exacerbated when SSPs pass along the new request from connected partners to the SSP's partners. The number of requests can multiply tenfold, with 1111 total requests to the DSP and still only one winner being possible.

The removal of these duplicates is further complicated by the need for advertising platforms to handle requests within a short time span of under 100 milliseconds. With the duplicates themselves spanning from less than a millisecond to 10's of milliseconds of time, there are additional complications. The sub-millisecond span for duplicates especially complicate systems with intercommunication or out-of-process latencies in the greater than millisecond range, or heavily loaded systems.

Caching systems are too slow the find coalesce items which occur close together. Caching systems are too slow to coalesce requests that are operating at machine speed.

BRIEF SUMMARY

The present invention ensures that any duplicate internet request stream can be handled in all ranges of timing from microseconds to milliseconds to any arbitrary length. The timing is not limited by intermachine communications, but only by configured local RAM necessary to hold the connections. It significantly outperforms any centralized out-of-process DB system, no matter how fast that system is.

According to embodiments of the invention, a system and method for coalescing network request streams assigns groups of requests to independent coalescing machines, each of which separately processes its assigned group according to processing rules. The use of independent coalescers allows the system to be scaled nearly infinitely with a shared nothing architecture and operates fully at machine in-process speeds.

The immediate use of the inventive approach is in the coalescing of OpenRTB bid streams. However, the applications of the inventive scheme are not limited to this use any TCP request stream can be coalesced in this manner. These bid streams are a primary form of communication between programmatic advertising systems. OpenRTB bid streams often contain numerous duplicate requests for the same ad impression. Often numbering in the thousands. This is due to the publisher making multiple requests to SSPs and other upstream programmatic partners who themselves connect to one another.

The present invention scales nearly infinitely with a shared nothing architecture and is able to operate fully at machine in-process speeds.

In one aspect of the invention, a system for coalescing a network request stream from one or more sources, where the request stream comprises a plurality of requests including a primary request and a plurality of duplicate requests, includes: a load balancer configured for reading data within the plurality of the requests and categorizing the requests into a plurality of request groups; a hash application configured for applying a consistent hashing algorithm to each of the request groups; a plurality of independent coalescers, each coalescer configured to receive an assigned request group based on its applied hash and process the assigned request group according to a set of rules to determine whether the primary request is present within its assigned request group and to hold all other requests within the assigned request group until the primary request is identified, wherein the plurality of coalescers have a shared nothing architecture; and a system backend configured for delivering the primary request identified according to the set of rules to a destination platform.

DETAILED DESCRIPTION OF EMBODIMENTS

Figure 1:
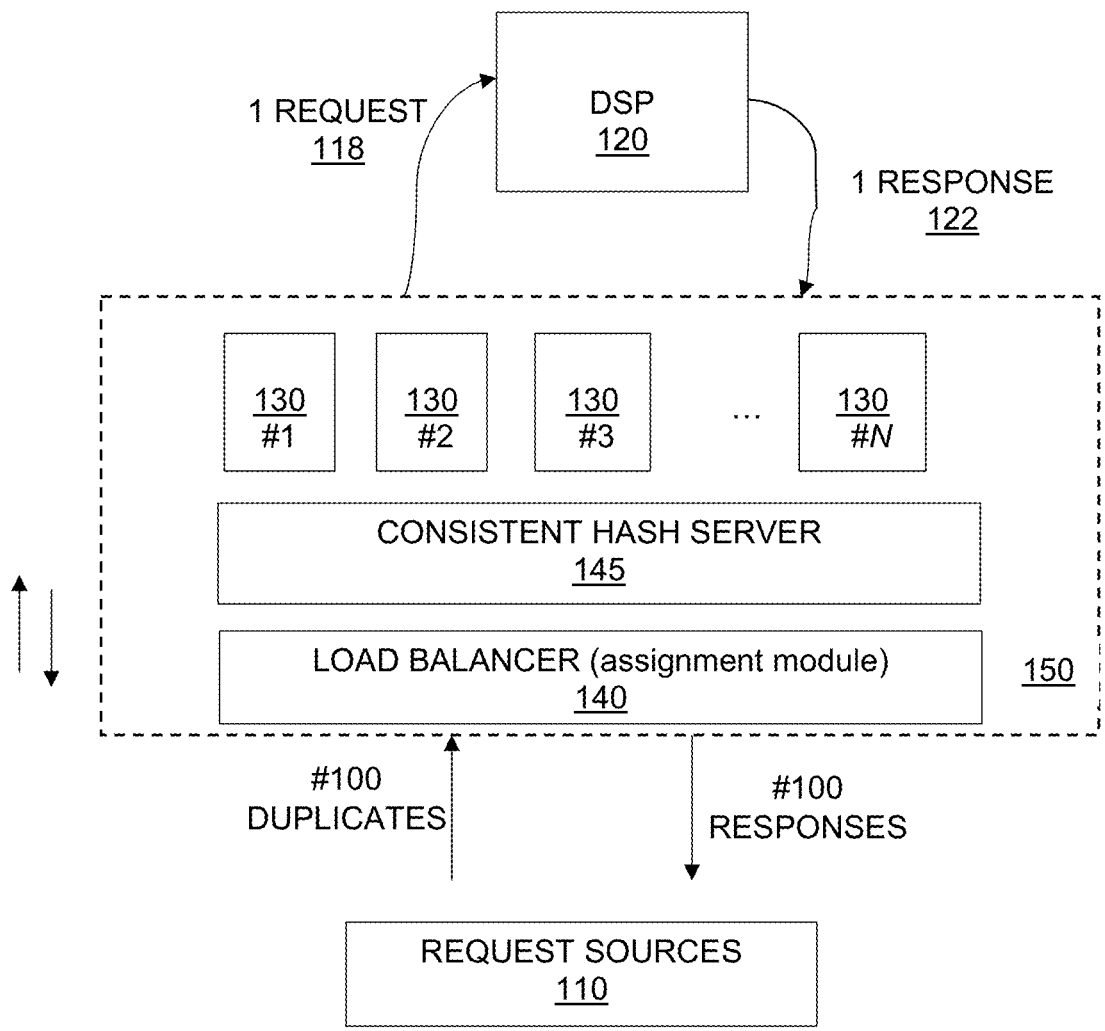
FIG. 1 diagrammatically illustrates a high level interaction according to an embodiment of the inventive coalescing system in which incoming duplicate requests are routed to multiple machines for identifying the Primary request from among the duplicates.

Unless defined otherwise, all technical and scientific terms used herein have the plain and ordinary meaning as would be understood by a person of skill in the art. Unless expressly limited, where a term is provided in the singular, the description contemplates the plural of that term, i.e., one or more, and where a term is provided in the plural, the inventors also contemplate the singular of that term. To provide a clarifying example, when an object is described, unless that object is expressly described as a single object, "one or more object", or "at least one object" also falls within the meaning of that term.

Definitions

The description herein employs a large number of terms and acronyms that are commonly used in the software, networking and/or advertising fields. For the reviewer's convenience, Table 1 provides a list of the acronyms and their common meanings in the industry.

TABLE 1

| ACRONYM | DEFINITION |
| --- | --- |
| UX | User experience |
| SSP | Supply side platform |
| DSP | Demand side platform |
| RTB | Real-time bidding |
| SaaS | Software as a service |
| URL | Uniform Resource Locator |
| CDN | Content Delivery Network |
| API | Application Programming Interface |
| JSON | JavaScript Object Notation |
| UI | User Interface |
| TCP | Transmission Control Protocol |

The following additional definitions are used herein:

"Shared Nothing architecture" is a distributed computing architecture in which each update request is satisfied by a single node (processor/memory/storage unit). The intent is to eliminate contention among nodes. Nodes do not share (independently access) memory or storage. Each element of the inventive system is independent in communication and data, a single coalescer assignment module can communicate with a single coalescer module and also any number of coalescer assignment modules can communicate with any number of coalescer modules without sharing any state or configuration at runtime. Configuration deployment is handled separately and is deployed from the Configuration Module.

"Direct Server Return (DSR)"—is a process by which proxies forward traffic and the server to which it is forwarded responds directly to the original requestor. This allows the proxy front ends to handle more traffic since they do not also need to handle and hold responses.

"Request"—Any internet request whether it be TCP, HTTP, UDP, etc. can be handled by the system. As used herein, a TCP request is used as an example, however, the system is not limited to this specific type of requests.

"OpenRTB" (or "oRTB")—A specification which defines the JSON representation of data for programmatic ad requests. It contains both formal parameters and extensible fields which can contain arbitrary values. While the illustrative example relates to an application for OpenRTB, the inventive approach can be used for any internet request that traditionally is handled by a load balancer.

"Out-of-Process"—Any process not operating at local code RAM speeds is out-of-process. This includes external database systems, caching systems, etc.

"Consistent Hashing"—Consistent hashing is a method in which backends in a proxy or load balancer are selected from a pool of options using a known algorithm that requires no load balancer inter-machine communication. Each machine will choose the same backend without any snared state between them.

"Supply Side Platform" or "SSP", as used herein, means any source of bid requests for ad impressions, i.e., any entity that sells ads. This could be direct to device, a traditional SSP or a DSP acting as an SSP, and therefore will have a broader meaning that is conventionally applied to "SSP" in the industry. An alternative term for SSP is a "requester service".

"Demand Side Platform" or "DSP", as used herein, means any source of bid responses or purchases of ad impressions. Basically, a DSP can be any entity that buys ads. It should be noted that this definition is broader that the conventional meaning of "DSP" as used in the industry.

"Multiplexing" means returning a single DSP bid to multiple SSPs based on the identification of duplicates.

"Bid" means an offer from a DSP to buy an ad. A bid can be single or multiple. A bid response back to an SSP can include any combination of DSPs and responses to various possible display configurations, without limitation.

"No-Bid" means any response from a DSP that indicates that it will not purchase an ad.

The inventive system and method ensure that a duplicate internet request stream can be handled in all ranges of timing from microseconds to milliseconds to any arbitrary length. The timing is not limited by intermachine communications, but only by configured local RAM necessary to hold the connections. It significantly outperforms any centralized out-of-process DB system, no matter how fast that system may be.

The exemplary use of the system described herein is in the coalescing of OpenRTB bid streams. However, the applications of the inventive approach are not limited to this use. In fact, any TCP request stream can be coalesced in this manner. These bid streams are a primary form of communication between programmatic advertising systems. OpenRTB bid streams often contain numerous duplicate requests for the same ad impression. Often numbering in the thousands. This is due to the publisher making multiple requests to SSPs and other upstream programmatic partners who themselves connect to one another. The scheme described herein solves this problem.

Programmatic Platforms such as SSPs, Ad Exchanges and DSPs interconnect and then handle every impression sent, or resent to them, causing massive volumes of redundant activity. This creates an environment where a large number of duplicate ad impressions are being received. For example, a single ad may be sent to 10 SSPs which then connect to 10 other SSPs, each of which then connects to DSPs. If there are 10×10 connections generating 100 duplicate requests to 10 DSPs, this results in 1000 requests to DSPs when, in actuality, only one ad impression exists.

The removal of these duplicates is further complicated by the need for advertising platforms to handle requests within a short time span of under 100 milliseconds. With the duplicates themselves spanning from less than a millisecond to 10's of milliseconds of time, there can be additional complications. The sub-millisecond span for duplicates especially complicates systems with intercommunication or out-of-process latencies in the greater than millisecond range, or heavily loaded systems.

In existing approaches, if duplicates enter within the latency window at the bottom they will not be caught in cache. This demonstrates why one cannot simply cache with millisecond latencies. When duplicates are received within one or two milliseconds of each other, existing centralized DB or caching solutions can break down. The inventive approach described herein addresses this problem through the use of a consistent hashing algorithm in local memory without a remote database or cache. The inventive approach uses a hash of data and a consistent hashing algorithm to select workers and perform load balancing across them. Possible algorithms that may be used to lock the duplicates until the original request is complete include a spin lock (no-wait polling) tunable algorithm that unwinds when the first request returns or a specified time period has expired, or a Golang-style channel approach. The hash may be created from a combination of data including standard IP, source, size, etc., or any other data available. The hashing algorithm is used to spread across servers and operate at local memory speed.

Intermachine communication, database storage, and the entire chain of events related to it are measured in milliseconds, meaning that any requests that are faster than this envelope can be lost. In addition, any centralized system does not scale well. Eventually the system becomes overloaded.

The present approach scales nearly infinitely with a shared nothing architecture and operates fully at machine in-process speeds.

FIGS. 1-4 illustrate a variety of implementations of the inventive system, which includes the basic components of:
1. Coalescer Assignment Module, which is a load balancer that assigns the incoming requests (from various SSPs) for processing via a hashing algorithm and distributes them accordingly;
2. Hash Server(s) for executing a hashing algorithm for building a hash that determines a coalescer to which a request will be sent; and
3. Coalescer (also referred to as "Coalescer Module" or "Spot Coalescer"), which is one of potentially many local machines (servers with memory) that receive incoming requests as assigned by the load balancer, each request associated with a hash provides data that allows characteristics of the request to be identified, such as whether the request is an original or duplicate, and determines which coalescer the request will be routed to and how that request will be processed. For example, if the hash indicates that the request is a duplicate, the original request will be processed for transfer to the DSP, while the duplicates may be marked as, e.g., "no-bid", and returned to the SSPs with an indication that the request was not accepted.

The inventive system connects an inbound OpenRTB Stream, described in the examples as "requests:" and a Destination OpenRTB Programmatic Advertising System, identified in the examples as DSP.

The basic components of the inventive system should be able to meet the requirements of: (a) a fast load balancer capable of reading post data, i.e., the data in the request as well as any metadata associated with the request; (b) consistent hash servers; and (c) standard web (internet) front ends with very fast local RAM and shared memory caching.

FIG. 1 diagrammatically illustrates the basic interactions according to an embodiment of the inventive approach in which one or more request sources, e.g., SSPs, 110, wish to submit requests to a DSP 120. As described above, the same original request can be duplicated through the communication of the request across multiple SSPs who in turn may communicate the requests the other SSPs, resulting in a large number of duplicate requests (see, e.g., FIG. 2). These multiplied requests are illustrated as #100, however, the number can be anywhere from a handful to hundreds or thousands. In order to avoid overwhelming the DSP with countless duplicates, the incoming requests are input into the inventive coalescing system 150 which includes a load balancer 140 (or assignment module). As is known in the art, load balancers in general make routing decisions by inspecting information within the network packet. In the preferred layer 7 load balancing employed in the inventive system, the load balancer reads the content of the incoming message, i.e., the request, in order to decide how to distribute it. A device that performs layer 7 load balancing is sometimes referred to as a "reverse-proxy server". Load balancers may be hardware, software, or a combination of both. An example of an appropriate software load balancer that may be employed in the present scheme is the Fast Layer 7 load balancer available from NGiNX, Inc. (i.e., "engine X"), which is oRTB aware.

Load balancer 140 reads the incoming request and searches for selected fields that allow it to separate the requests. For example, the fields may include various combinations of internet protocol ("IP") address, uniform resource locator ("URL"), date, time, and other elements of the request data or metadata. Based on rules defined within a configuration module, the load balancer 140 classifies the requests using information in the request and hash application 145 (which may reside on the same device or server as the load balancer, or may be executed by separate servers) constructs a consistent hash that is applied as metadata to the request to specify the coalescer 130, e.g., #1 through #N, to which the request will be sent and how the request is to be handled by the coalescer. Each coalescer is independent from others, with no communication among them. Load balancer 140 communicates with each coalescer separately. A number of different schemes may be used to distribute the requests amongst the different coalescers, but the general goal is the same: to separate the requests into groups or batches that can each be quickly processed in any number of local machines according to a set of rules to determine which requests are duplicates ("Duplicates") and which are originals ("Primary"), to hold the requests in memory in the assigned machine until a request 118 meeting the appropriate criteria, e.g., a Primary, a specified value, or other desired feature, for delivery to the DSP 120 is identified. Appropriate criteria for the Primary may be as simple as being the original request, however, other rules may be applied, such as quality, value, display characteristics, geographical location, dimensions, timing, etc. of the request. Once the DSP 120 responds with acceptance (122) of the delivered Primary, the acceptance of the Primary is reported to the SSP that was the source of the request. The remaining duplicates that are being processed within the different coalescers 130 may be processed according to dispositioning rules, which may include designating with a "No-Bid" tag, and responding to the SSPs that the requests were not accepted. As shown in FIG. 1, #100 responses are returned to the sources 110, with presumably one accepted request, the Primary, and 99 No-bid requests. As will be readily apparent to those in the art, other variations in responding to non-accepted requests may be used. Additional scenarios involving ad auctions are disclosed in co-pending U.S. application Ser. No. 17/589,618, filed Jan. 31, 2022, which is incorporated herein by reference in its entirety.

Figure 2:
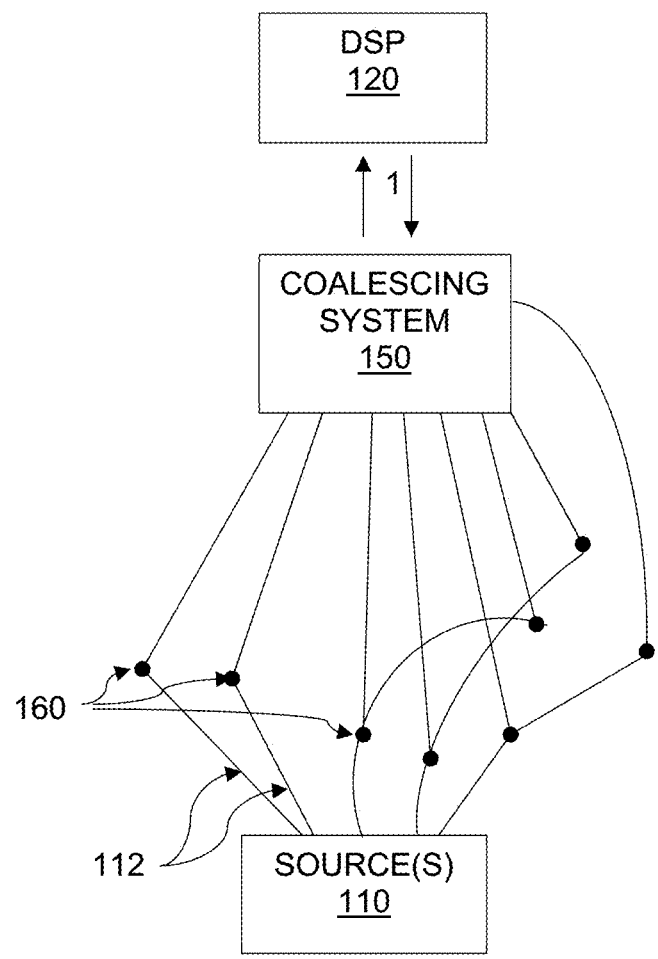
FIG. 2 diagrammatically illustrates a exemplary scenario in which duplicates are generated by multiple SSPs and de-duplicated for delivery to the destination.

FIG. 2 illustrates an example of how the multiplication of requests occurs, with multiple SSPs sending the same request 112 from sources 110 to the coalescing system 150, as represented by multiple connections 160 between different SSPs.

Figure 3:
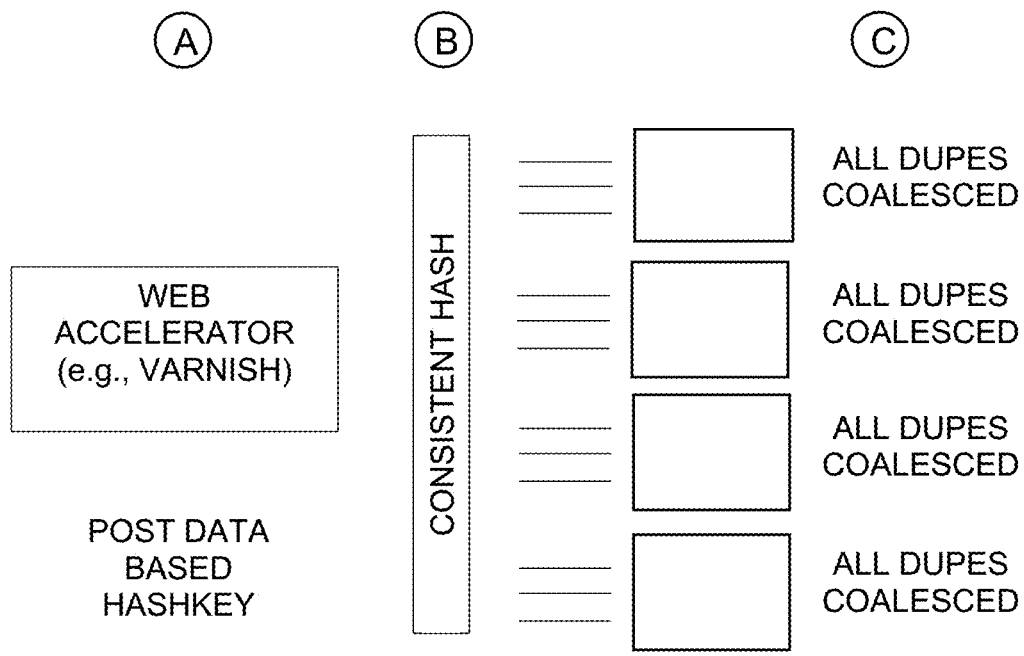
FIG. 3 illustrates a high level interaction similar to that of FIG. 1 where the three main components/modules of the inventive system are arranged as columns.

FIG. 3 is a high level diagram of the inventive system, similar to that shown in FIG. 1 where the three main components/modules are arranged as columns. Column A, in an exemplary embodiment, is a load balancer. The data read by the load balancer is the "POST DATA," or any other data available to the request. An example of an appropriate load balancer that may be employed in the present scheme is the Fast Layer 7 load balancer available from NGiNX, Inc. (i.e., "engine X"), which is oRTB aware. Column B mechanistically represents the consistent hash of the data according to the inventive approach, applied to select a server backend and squeezing duplicates in column C, the coalescer module, which can be made up of hundreds of machines.

The system components are related in that the requests from any number of external systems (sources 110) send requests over TCP connection to the IP endpoint, which may also be any number of nodes, which sends coalesced bids to individual nodes of DSP 120 via TCP connection. System 2 then sends the coalesced bid stream to (B).

The number of nodes in (1) and (2) are a factor of load handling. Any number of external systems can hit the Layer 7 LB endpoint. This could be any number of machines (shared nothing) using the same algorithm (consistent hash) and the post data to coalesce bids into the same coalescing module so that they can be handled in local memory.

Module 2 is configured with Module 3 as its "leafier" and communicates its presence. Clustering, leader selection, etc. in the load balancer cluster can be performed by any of the industry standard algorithms such as raft consensus and similar. Module 3 then configures Module 1 with the proper contig to coalesce the request streams. The coalescer modules communicate with the Load Balancer module to communicate their presence and use any of the accepted algorithms to redistribute assignment such as Paxos-based gossip algorithms. This information is stored at the LB layer to ensure that proper coalescer modules are chosen for new requests.

The front end machines accept network connections and, using information in the request, based on rules defined in the Configuration Module, build a hash, potentially using xxHASH or another fast hash algorithm, and a consistent hashing algorithm to determine a coalescer to which the request will be sent. Direct Server Return or Proxy can be used. Alternatively, least connection tracking can be used for the first duplicate received to balance the load more evenly. Alterna OpenRTB bid streams are a primary form of communication between programmatic advertising systems. OpenRTB bid streams often contain numerous duplicate requests for the same ad impression, often numbering in the thousands.

Figure 4:
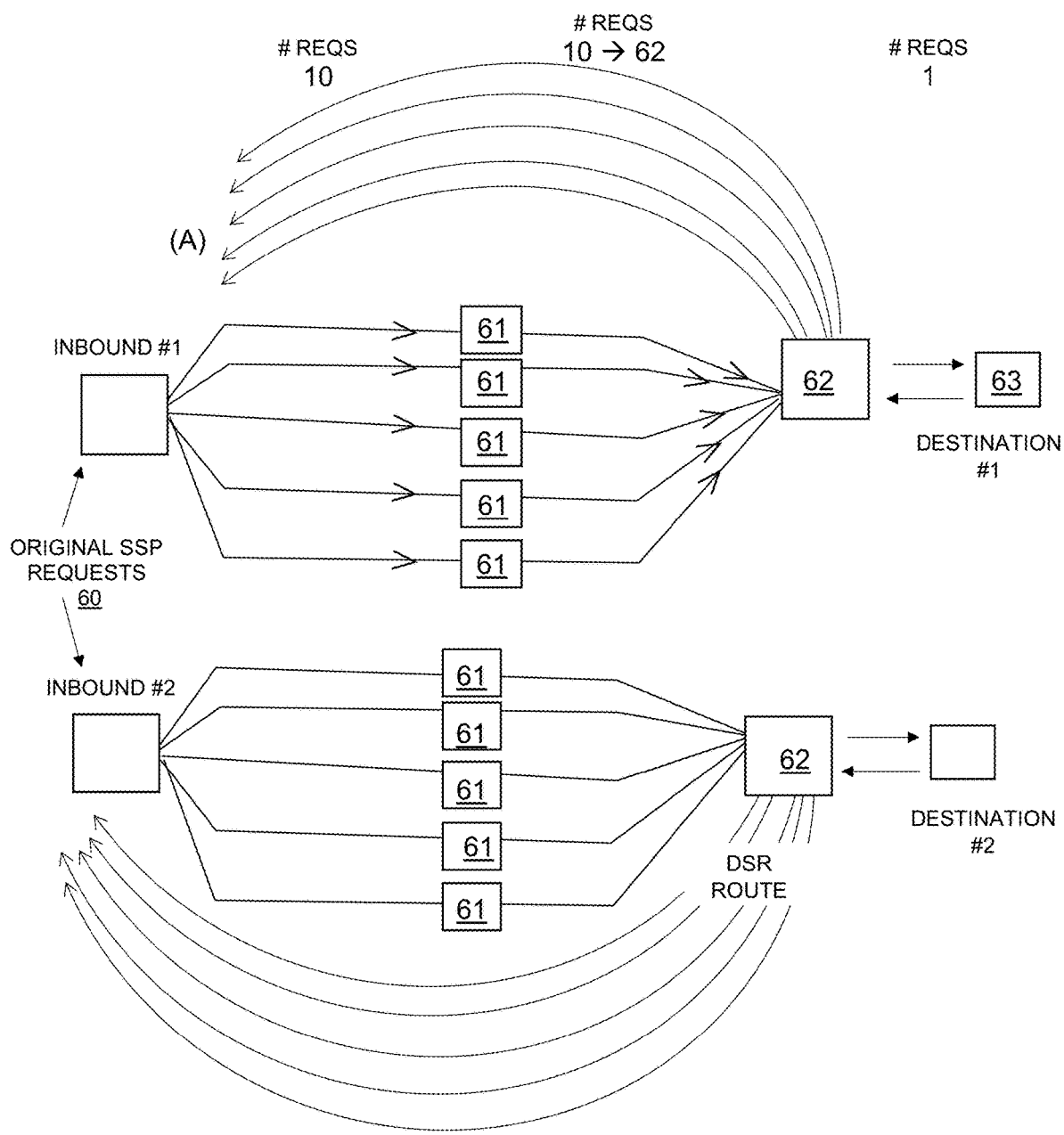
FIG. 4 diagrammatically illustrates how the inventive system can operate with a DSR (direct server return) from any given coalescer node.

FIG. 4 diagrammatically illustrates how the system can operate with a DSR (direct server return). Inbound SSR requests 60 are input into one or more load balancer(s) 61 and into coalescer module 62 for delivery of a single request to destination 63. (Note that while a single coalescer module 62 is shown, it may actually be many, even hundreds of machines.) An example of an appropriate DSR is described in the Microsoft.com tech-community networking-blog/direct-server-return-dsr-in-a-nutshell/ba-p/693710, which works from any given coalescer node. At the lower portion of this diagram, the Direct Server Return path does not return responses through the load balancer, which increases performance. Both paths are valid, selectable and could be active with acceptable configuration, but the DSR approach is faster.

Platforms such as Ad Exchanges and DSPs handle every impression but can also cross-connect sending impressions to each other, resulting in massive volumes of redundant activity. In an environment where a large number of duplicate ad impressions are being received, a single ad may be sent to 10 SSPs which then connect to 10 additional SSPs, each of which connect to DSPs. These 10×10 connections generate 100 duplicate requests with 10 DSPs receiving a 1000 requests when, in fact, only one ad impression actually exists.

The removal of these duplicates is further complicated by the need for advertising platforms to handle requests within a short time span of under 100 milliseconds. With the duplicates themselves spanning from less than a millisecond to 10s of milliseconds of time there is additional complication. The sub millisecond span for duplicates especially-complicate systems with intercommunication or out-of-process latencies in the greater than millisecond range, or heavily loaded systems.

When duplicates are received within one or two milliseconds, existing centralized DB or caching solutions break down and other approaches are necessary. Actively, the system can keep a list of servers over the last period of time with originals (the first sent) vs duplicates and balance the total based on load determination.

The coalescer uses the computed and a Thundering Stampede algorithm to queue up return channels based on the first version of the hash. This effort is at memory local speeds based on all duplicates being sent to the same coalescer.

| Queueing algorithm |
| --- |
| Thundering Herd<br>var (<br>    lruCache lru.Cache<br>    acquireLocker ChanLocker<br>        ErrCacheItemNotFound = errors.New("cache item not found")<br>)<br>func GetUser(id string) (interface{ }, error) {<br>    v, ok := lruCache.Get(id)<br>    if ok {<br>        return v, nil<br>    }<br>    var err error<br>    acquired := acquireLocker.Lock(id, func( ) {<br>        v, err = expensiveDBLookup(id) |

-continued

Queueing algorithm

```
        if err != nil {
            return
        }
        lruCache.Add(id, v)
    }}
    if acquired {
        return v, err
    }
    v, ok = lruCache.Get(id)
    if !ok {
        return nil, ErrCacheItemNotFound
    }
    return v, nil
}
type ChanLocker struct {
    sync.Map
}
func(w *ChanLocker) Lock(key interface{ }, acquireFn func( )) bool {
    waitCh := make(chan struct{ })
    actual, locked := w.LoadOrStore(key, waitCh)
    if !locked {
        acquireFn( )
        w.Delete(key)
        close(waitCh)
        return true
    }
    <-actual.(chan struct{ })
    return false
}
```

DSR can be used at the coalescer level to return the response from the upstream system (B) to the requesting system (A) when the first of the coalesced requests returns.

Calculating Hashes

Any element of the request can be used in any combination. There are two general approaches: strong and weak. In the weak method, values that approximate uniqueness, but don't guarantee it, are used. This can include combinations of site, time size, etc., but ultimately can include any element of the request. In the strong method, a value explicitly designated as the duplicate indicator can be used. This may be agreed upon by industry or by agreement between the participants in the transaction. Examples include the Transaction ID in Prebid.js or other created value in any of the systems along the way.

3. Configuration Module

The configuration UI uses a database to track the following configuration of the following parameters:
 1. Machine Members of the Coalescing Assignment Module
 2. Machine Members of the Coalescing Group Each Coalescer broadcasts to its assigned Configuration module that it is ready for traffic. The Configuration Module then updates each Coalescing Assignment module with the new consistent hashing table if necessary. The Configuration Module performs regular uptime checks of the Coalescers and removes them from the hashing tables as necessary. Monitoring and availability of the Coalescing Assignment module members is expected to be handled by the upstream load balancer or other means.

For implementing the inventive approach, connecting the coalescer is functionally equivalent to connecting a load balancer. The Coalescer Assignment Modules can be added to a traditional load balancer or sent traffic via any other method like anycast Ips, virtual Ips, etc.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

Figure 5:
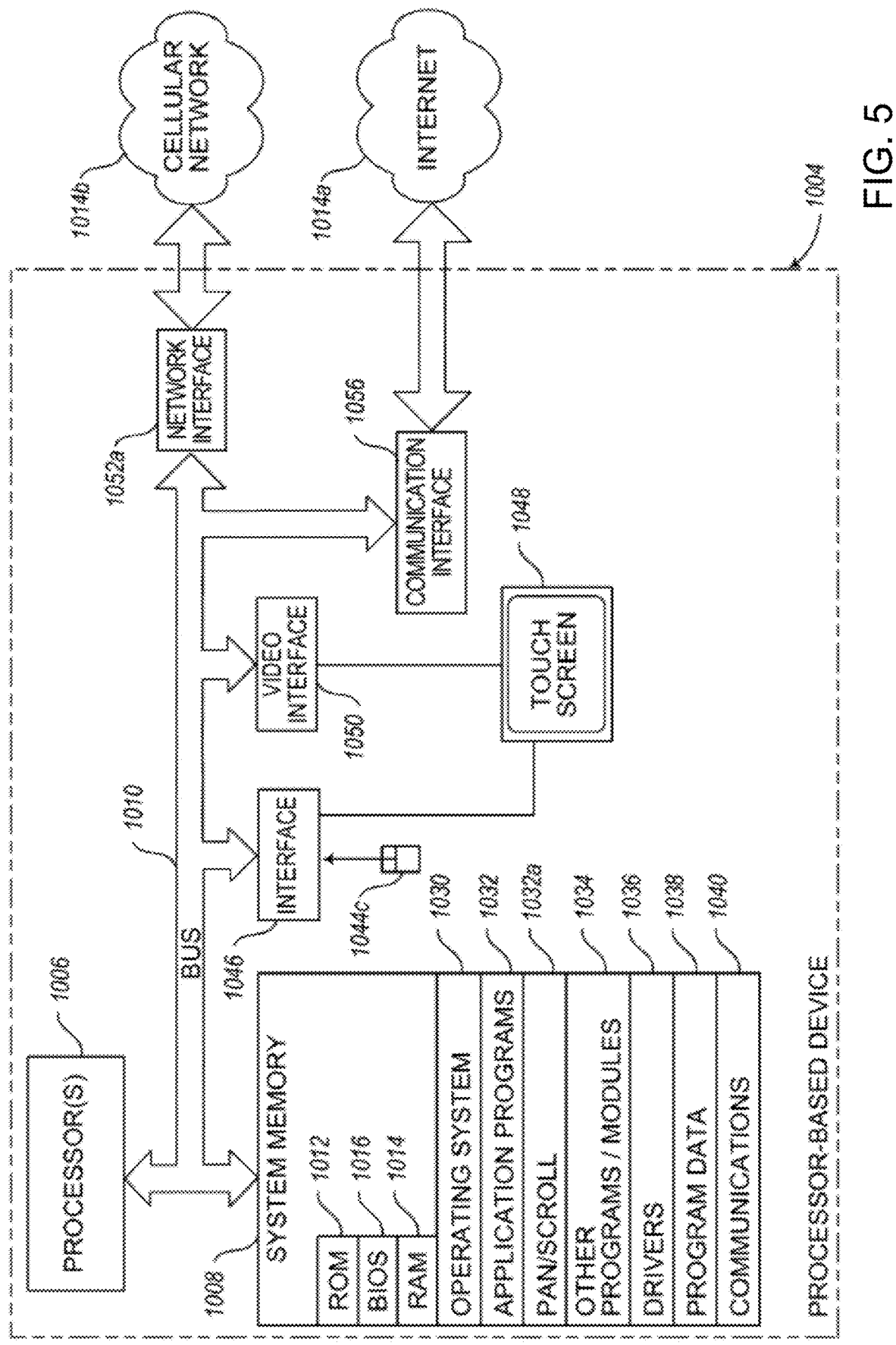
FIG. 5 is a block diagram of an embodiment of the processor-based system that may be used to implement the inventive platform.

FIG. 5 illustrates an example of a processor-based system 1000 that may be used to implement embodiments of the inventive platform described herein. Some embodiments may be described in the general context of processor-executable instructions or logic, such as program application modules, objects, or macros being executed by one or more processors. Those skilled in the relevant art will appreciate that the described embodiments, as well as other embodiments, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based system may, for example, take the form of a smartphone or tablet computer, which includes one or more processors 1006, a system memory 1008 and a system bus 1010 that links various system components including the system memory 1008 to the processor(s) 1006. The system 1000 may be a single system or more than one system or other networked computing device.

The processor(s) 1006 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 5 are of conventional design. As a result, such blocks need not be described in further detail herein, as they will be understood by those skilled in the relevant art.

The system bus 1010 can employ any known bus structures or architectures, including a memory bus with memory controller, a peripheral bus, and a local bus. The system memory 1008 includes read-only memory ("ROM") 1012 and random access memory ("RAM") 1014. A basic input/output system ("BIOS") 1016, which can form part of the ROM 1012, contains basic routines that help transfer information between elements within system 1000, such as during start-up. Some embodiments may employ separate buses for data, instructions, and power.

The system 1000 may also include one or more solid state memories, for instance Flash memory or solid state drive (SSD) 1018, which provides nonvolatile storage of computer-readable instructions, data structures, program modules and other data for the system 1000. Although not depicted, the system can employ other non-transitory computer- or processor-readable media, for example a hard disk drive, an optical disk drive, or memory card media drive.

Program modules can be stored in the system memory 1008, such as an operating system 1030, one or more application programs 1032, other programs or modules 1034, drivers 1036 and program data 1038.

The system memory 1008 may also include communications programs 1040, for example a server and/or a Web client or browser for permitting the system 1000 to access and exchange data with other systems such as client computing systems, websites on the Internet, corporate intranets, or other networks.

The operating system 1030, application programs 1032, other programs/modules 1034, drivers 1036, program data 1038 and server and/or browser 1040 can be stored on any other of a large variety of non-transitory processor-readable media (e.g., hard disk drive, optical disk drive, SSD and/or flash memory.

A client can enter commands and information via a pointer, for example through input devices such as a touch screen 1048, or via a computer mouse or trackball 1044 which controls a cursor. Other input devices can include a microphone, joystick, game pad, tablet, scanner, biometric scanning device, etc. These and other input devices (i.e., "I/O devices") are connected to the processor(s) 1006 through an interface 1046 such as a touch-screen controller and/or a universal serial bus ("USB") interface that couples user input to the system bus 1010, although other interfaces such as a parallel port, a game port or a wireless interface or a serial port may be used. The touch screen 1048 can be coupled to the system bus 1010 via a video interface 1050, such as a video adapter to receive image data or image information for display via the touch screen 1048.

The system 1000 operates in a networked environment using one or more of the logical connections to communicate with one or more remote computers, servers and/or devices via one or more communications channels, for example, one or more networks 1014a, 1014b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based system 1004 may include one or more network, wired or wireless communications interfaces 1052, 1056 (e.g., network interface controllers, cellular radios, Wi-Fi radios, Bluetooth radios) for establishing communications over the network, for instance the Internet 1014b or cellular network 1014a.

In a networked environment, program modules, application programs, or data, or portions thereof, can be stored in a server computing system (not shown). For convenience, the processor(s) 1006, system memory 1008, and network and communications interfaces 1052, 1056 are illustrated as communicably coupled to each other via the system bus 1010, thereby providing connectivity between the above-described components. In some embodiments, system bus 1010 may be omitted and the components are coupled directly to each other using suitable connections.

Other examples of the invention will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

The invention claimed is:

1. A system for coalescing a network request stream from one or more sources in communication within a network, the request stream comprising a plurality of requests including a primary request and a plurality of duplicate requests, the system comprising:
    a processor;
    a load balancing module in communication with the network, the load balancing module configured for receiving the request stream and reading data within the plurality of the requests and categorizing the requests into a plurality of request groups based upon information fields within each request;
    a hash server configured for applying a consistent hashing algorithm to each of the request groups;
    a plurality of independent coalescer modules, each independent coalescer module comprising a local machine with a local memory configured to receive from the load balancing module an assigned request group based on its applied hash and process the assigned request group according to a set of rules to determine whether the primary request is present within its assigned request group and to hold all other requests within the assigned request group in its local memory until the primary request is identified and accepted for delivery, wherein the plurality of independent coalescer modules have a shared nothing architecture;
    a system backend configured for delivering the primary request identified according to the set of rules to a destination platform; and
    wherein the load balancing module is executed on the processor.

2. The system of claim 1, wherein the information fields comprise one or more combination of internet protocol (IP) address, uniform resource locator (URL), date, time, and metadata.

3. The system of claim 1, wherein the one or more sources comprise one or a combination of supply side platforms (SSPs), ad exchanges, and demand side platforms (DSPs).

4. The system of claim 1, wherein the plurality of coalescer modules is further configured to assign a "No-Bid" tag to assigned request groups containing duplicate requests.

5. The system of claim 4, wherein the system is configured to notify the one or more sources of the No-Bid tagged requests.

6. The system of claim 1, wherein a source that initiated the primary request is notified of acceptance of the primary request.

7. The system of claim 1, wherein the load balancing module is a software-based 7 load balancer.

8. The system of claim 1, wherein the request stream is an OpenRTB bid stream.

9. The system of claim 1, wherein the plurality of independent coalescer modules comprises hundreds of local machines with local memories within a distributed computing architecture in which each local machine communicates independently with the load balancing module without sharing a state or configuration at runtime.

10. A method for coalescing a network request stream from one or more sources, the request stream comprising a plurality of requests including a primary request and a plurality of duplicate requests, the method comprising:
    receiving the request stream at a load balancing module and reading data within the plurality of the requests and categorizing the requests into request groups based upon information fields within each request;

applying a consistent hashing algorithm to each of the request groups;

distributing the request groups among a plurality of independent coalescer modules based on its applied hash, each independent coalescer module comprising a local machine with a local memory within a shared nothing architecture, each independent coalescer module configured to receive an assigned request group;

processing the assigned request group according to a set of rules to determine whether the primary request is present within the assigned request group;

holding all other requests within the assigned request group in the local memory of the assigned coalescer module until the primary request is identified; and delivering the primary request identified according to the set of rules to a destination platform.

11. The method of claim 10, wherein the information fields comprise one or more combination of internet protocol (IP) address, uniform resource locator (URL), date, time, and metadata.

12. The method of claim 10, wherein the one or more sources comprise one or a combination of supply side platforms (SSPs), ad exchanges, and demand side platforms (DSPs).

13. The method of claim 10, further comprising assigning a "No-Bid" tag to assigned request groups containing duplicate requests.

14. The method of claim 13, further comprising notifying the one or more sources of the No-Bid tagged requests.

15. The method of claim 10, further comprising notifying a source that initiated the primary request of acceptance of the primary request.

16. The method of claim 10, wherein the load balancing module is a software-based 7 load balancer.

17. The method of claim 10, wherein the request stream is an OpenRTB bid stream.

18. The method of claim 10, wherein the plurality of independent coalescer modules comprises hundreds of local machines with local memories within a distributed computing architecture in which each local machine communicates independently with the load balancing module without sharing a state or configuration at runtime.

* * * * *